United States Patent [19]

Hatada et al.

[11] Patent Number: 5,313,362
[45] Date of Patent: May 17, 1994

[54] PACKAGING STRUCTURE OF SMALL-SIZED COMPUTER

[75] Inventors: Toshio Hatada, Tsuchiura; Hiroshi Inouye, Ibaraki; Takao Ohba; Susumu Iwai, both of Hadano, all of Japan

[73] Assignee: Hitachi, Ltd., Japan

[21] Appl. No.: 885,979

[22] Filed: May 20, 1992

[30] Foreign Application Priority Data

May 31, 1991 [JP] Japan .................... 3-129850

[51] Int. Cl.⁵ .............................................. H05K 7/20
[52] U.S. Cl. .................... 361/709; 165/80.3; 361/725; 361/736
[58] Field of Search ............... 165/80.3, 185, 104.33; 174/15.1, 16.1; 364/708; 361/382–389, 390–395, 415, 689, 690, 702–705, 707, 709, 724, 725, 728–730, 736, 796

[56] References Cited

U.S. PATENT DOCUMENTS

| | | | |
|---|---|---|---|
| 4,084,213 | 4/1978 | Kirchner et al. | 361/384 |
| 4,571,456 | 2/1986 | Paulsen et al. | 179/2 C |
| 4,744,005 | 5/1988 | Milani | 361/384 |
| 4,980,848 | 12/1990 | Griffin et al. | 364/708 |
| 4,997,032 | 3/1991 | Danielson et al. | 165/46 |
| 5,086,509 | 2/1992 | Inubushi et al. | 361/386 |
| 5,136,465 | 8/1992 | Benck et al. | 361/384 |

FOREIGN PATENT DOCUMENTS

| | | |
|---|---|---|
| 62-10494 | 1/1987 | Japan . |
| 64-2397 | 1/1989 | Japan . |
| 712991 | 1/1980 | U.S.S.R. ............... 361/383 |

OTHER PUBLICATIONS

IBM Tech Discl Bull vol. 20, No. 6, Nov. 1977, pp. 2428 "Cooling Electrical Equipment", Gaunt et al.

*Primary Examiner*—Gerald P. Tolin
*Attorney, Agent, or Firm*—Evenson, McKeown, Edwards & Lenahan

[57] ABSTRACT

In a small-sized computer of a natural air-cooling type, a high-temperature radiator promotes natural convection so as to increase a quantity of heat radiation and to raise the allowable limit of heat generation of LSI chips, thereby improving the processing speed of the computer. For this purpose, a casing and fins are utilized as heat radiators at relatively low temperatures of about 40° C. which are safe even if they are touched by an operator's hands. On the other hand, the high-temperature radiator set at about 50° to 60° C. is provided inside of the casing, thus preventing the operator's hands from touching it directly. Heat generated by the LSI chips and so forth is transmitted to the high-temperature radiator through heat conduction or the like, and heat exchange is performed between the high-temperature radiator increased in temperature and the air introduced into the casing, in order to promote natural convection inside of the casing.

8 Claims, 13 Drawing Sheets

PACKAGING STRUCTURE OF SMALL-SIZED COMPUTER

BACKGROUND OF THE INVENTION

1. Industrial Field of the Invention

The present invention relates to a packaging structure of work stations, personal computers and electronic appliances of similar structures such as word processors (such apparatus will be all referred to as small-sized computers in this specification) and, more particularly, to a packaging structure of small-sized computers of lap-top types, desk-top types and notebook types.

2. Description of the Prior Art

Recently, the above-mentioned small-sized computers have been remarkably improved in their compactness and computing speed. Accordingly, amounts of generated heat by LSI chips and the like tend to increase, and it has been an extremely important subject to improve the cooling efficiency. Conventional small-sized computers of this kind are not provided with special cooling means, and heat generated by heat generating portions is cooled through natural heat radiation in many cases. One of such conventional examples is disclosed in Japanese Utility Model Unexamined Publication No. 62-10494 (a packaging structure of a printed wiring board). In this example, a board on which electronic component parts generating heat are mounted is inclined at an angle to promote natural convection. On the other hand, because the generated heat amounts are increased, as described above, it is necessary to improve the cooling efficiency actively, and new trials have been lately observed in relation to cooling methods. One example of such trials is disclosed in Japanese Patent Unexamined Publication No. 64-2397 (a cooling structure of an electronic circuit package) in which a liquid coolant is used instead of the cooling air and contacted directly with heat generating portions so as to cool them. This method is intended to improve the cooling efficiency by a large extent by use of liquid. Although there are also many known examples of methods utilizing the air, most of them are forcible air-cooling methods with fans, in which shapes of heat radiation fins and air passage structures are contrived for improvement.

In the case of a small-sized computer, the following three factors are particularly important as basic requirements: (a) it is compact; (b) it has a light weight; and (c) it does not consume power more than necessary. From such a standpoint, air-cooling without extra devices is very favorable as a cooling method, and further, natural air-cooling without fans is the best. However, the above-described example disclosed in Japanese Utility Model Unexamined Publication No. 62-10494 is a natural convection cooling method, and this method has a characteristic that the upper limit of heat radiation quantities is determined by temperature and areas of heat radiation surfaces. This conventional example is intended to realize the improvement within the range of the characteristic, and itself by a great extent. Moreover, the latter of the two conventional examples described above is not a structure which sufficiently satisfies the above-mentioned requirements (a)–(c), and it is not necessarily satisfactory as a small-sized computer which must have a low electricity demand and low costs.

SUMMARY OF THE INVENTION

It is therefore an object of the present invention to provide a packaging structure of a small-sized computer whose cooling efficiency is greatly enhanced as compared with the conventional techniques by improving a method of natural air-cooling which is the most effective method for realizing the small-sized computer which is (a) compact, (b) lightweight, and (c) decreased in power consumption.

In the case of natural air-cooling, the cooling efficiency is mostly determined by the temperature and area of a heat radiation surface. As a fundamental idea to enhance the cooling efficiency, therefore, it is important to make the temperature of the heat radiation surface as high as possible and to enlarge the area of the heat radiation surface. However, temperatures of the surfaces of a computer casing which are directly touched by an operator's hands must not exceed a level which is several degrees higher than the operator's body temperature at most. Consequently, according to the invention, a heat radiation surface is basically divided into some sections, and these sections of the heat radiation surface are set at some temperature levels, so as to solve the problems. In other words, the surface of a casing which may be touched by an operator's hands is arranged to be a low-temperature radiator at about several degrees plus the operator's body temperature, and a high-temperature radiator is provided inside of the casing and out of the reach of the operator's hands. The high-temperature radiator is contacted with heat generating portions through a heat-conductive member. Moreover, air holes are formed in the casing so that the outside air freely flows into and out of the vicinity of the high-temperature radiator. This is a basic form of the invention. As a developed form to enhance the cooling efficiency improving effect to a further extent, a heat radiator in connection with the high-temperature radiator inside of the casing is provided in a display unit, and a heat radiator is provided outside of the casing, thereby increasing the heat radiation area. Furthermore, as a different form, the casing itself is designed as a double-temperature heat radiator having a temperature difference in order to decrease the number of component parts and to reduce the costs.

With the above-described structure, when the temperature of the heat radiation surface is increased in the case of natural heat radiation, the temperature of the cooling air in the neighborhood is raised, thus promoting the convection. Then, the heat radiation quantity is exponentially increased In consequence, in addition to heat radiation from the casing serving as the low-temperature radiator, heat radiation of a quantity much larger than this is realized by the high-temperature radiator inside of the casing. This effect is enhanced as the area of the high-temperature radiator is enlarged.

DESCRIPTION OF THE PREFERRED EMBODIMENTS

Figure 1:
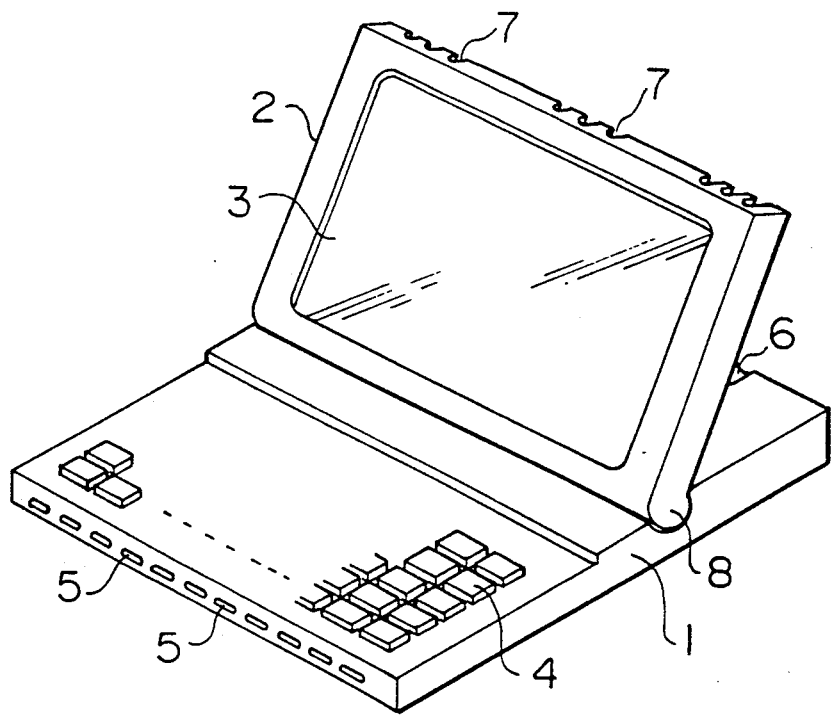
FIG. 1 is a front-side perspective view of a first embodiment according to the invention.
Figure 2:
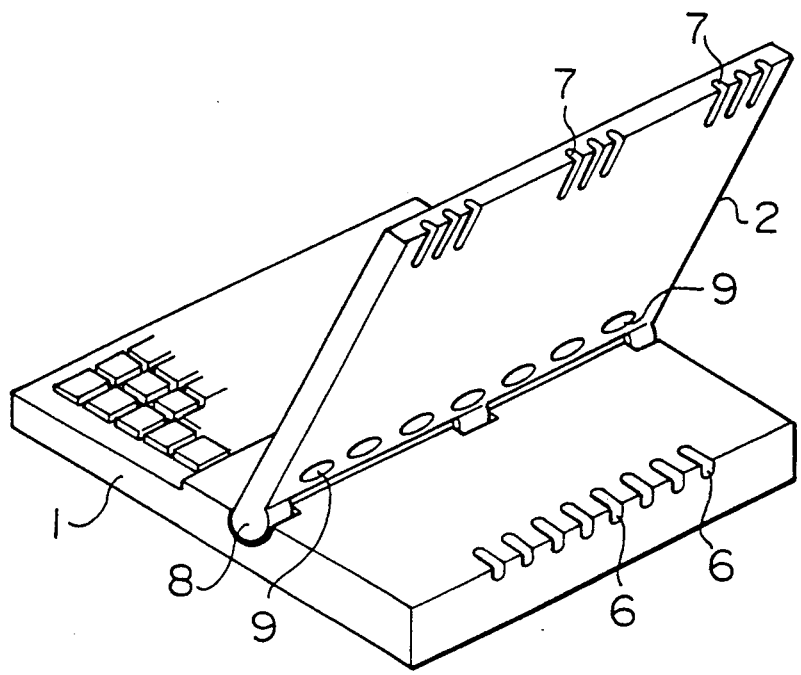
FIG. 2 is a rear-side perspective view of the first embodiment.
Figure 3:
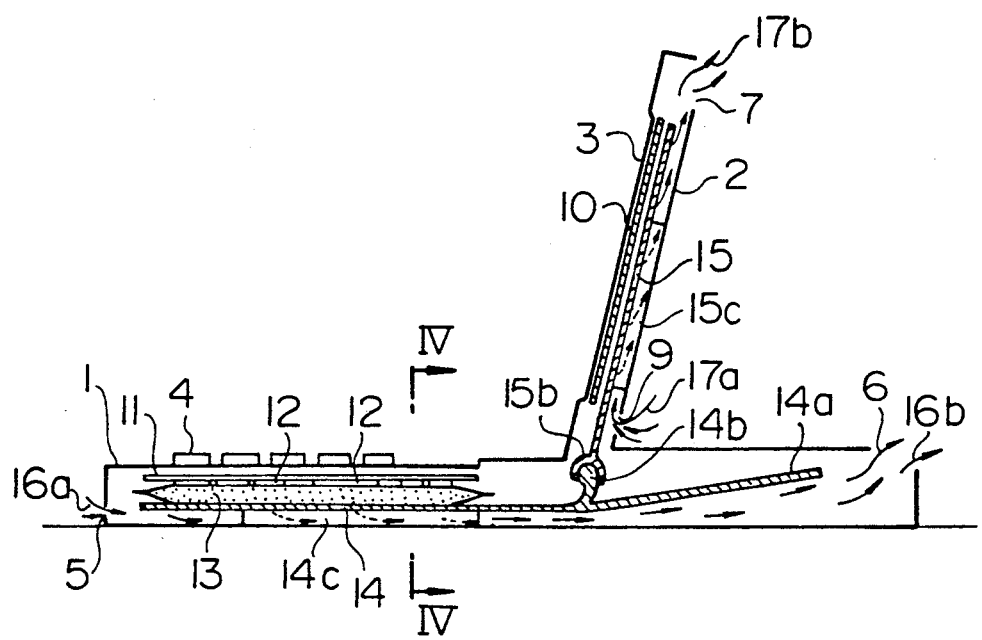
FIG. 3 is a vertical sectional view of the first embodiment.
Figure 4:
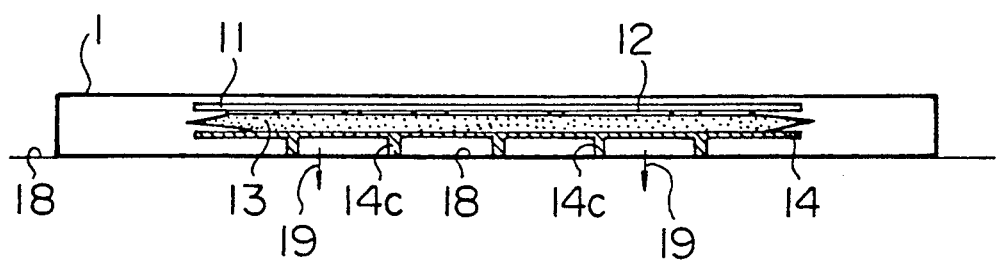
FIG. 4 is a sectional view taken along the line IV–IV in FIG. 3.
Figure 5:
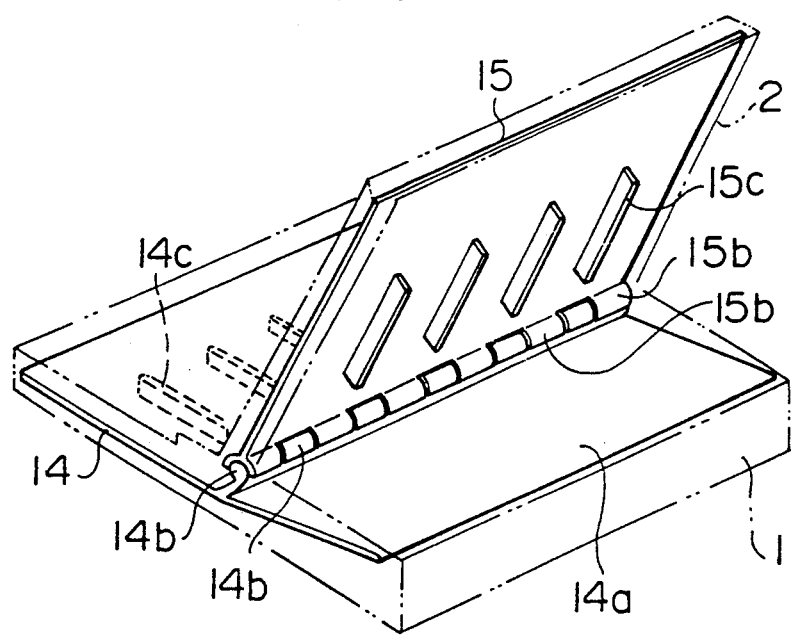
FIG. 5 is a partial view of the first embodiment.

A first embodiment according to the present invention will be described with reference to FIGS. 1 to 5. FIG. 1 is a front-side perspective view of a notebook-type small-sized computer. Inlets 5 of the outside air are formed in a front-side portion of a casing 1 on which a keyboard 4 or the like is mounted, and air outlets 6 are formed in a rear-side portion of the casing 1. Also, air outlets 7 are formed in an upper-side portion of a frame plate 2 surrounding a display screen 3. A display unit comprising the display screen 3, the frame plate 2 and so forth can be freely swung forwardly and backwardly about a rotary portion 8. FIG. 2 is a rear-side perspective view of the first embodiment. Vent holes are likewise formed in the display unit in such a manner that the outside air flows in through inlets 9 and flows out through the outlets 7. FIG. 3 is a vertical cross-sectional view of the first embodiment, and FIG. 4 is a horizontal cross-sectional view taken along the line IV—IV in FIG. 3. A substrate on which LSI chips 12 are mounted is thermally connected to a high-temperature radiator 14 through a heat-conductive member 13 of an elastic structure. The high-temperature radiator 14 comprises fins 14c in contact with the casing 1, branch radiator connecting portions 14b, and an intermediate-temperature radiator a extending toward the rear side of the casing 1. A branch radiator 15 is thermally connected to the high-temperature radiator 14 through branch radiator connecting portions 15b, and is located in the vicinity of a back light 10 provided on the rear surface of the display screen 3. The branch radiator 15 includes fins 15c which are in contact with the frame plate 2. As shown in FIG. 4, the fins 14c on the side of the keyboard 4 are provided at a plurality of locations. FIG. 5 is a perspective view showing the radiators 14 and 15 provided inside of the casing 1. The branch radiator 15 is arranged to be swung with the display unit while maintaining a favorable condition of thermal connection by means of the connecting portions 14b and 15b which are provided at a plurality of locations. The fins 15c, like the fins 14c, are provided in plural.

In the above structure, the radiators 14, 14a and 15, the branch radiator connecting portions 14b and 15b, and the fins 14c and 15c are made of, for example, aluminum plates which are excellent in heat conductivity. The heat-conductive member 13 having an elastic structure is composed of a bag made of a sheet of aluminum foil on both surfaces of which an insulating resin such as polyethylene, polypropylene or the like is laminated in the form of thin films, and highly heat-conductive liquid such as heat-conductive grease, heat-conductive silicone oil, carbon fluoride solution or the like which is sealed in the bag, or such liquid with metallic coiled springs, U-shaped metallic leaf springs or metal wool, as a metallic scourer, extending between opposite inner surfaces of the bag, which is sealed in the bag. An example of this type is disclosed in U.S. patent application Ser. No. 07/800268.

Next, the operation and effect of the above embodiment will be described. While the small-sized computer is used, the display unit is maintained in a slightly backwardly inclined and open state, as shown in FIG. 1. When the power source is turned on to enable to operate the small-sized computer, heat generating portions such as the LSI chips 12, the back light 10 and so forth shown in FIG. 3 begin to generate heat. Accordingly, temperatures of other component parts are increased, but a heat flow to be described below is realized to suppress these temperatures to a certain level. First, due to the heat generated by the LSI chips 12, temperatures of the LSI chips 12 and the substrate 11 are raised, and heat thus generated is smoothly transmitted to the high-temperature radiator 14 through the heat-conductive member 13. Since the radiator 14 is constructed in the above-described manner, the heat flow is divided into a flow further conducted to the casing 1 through the fins 14c, a flow transmitted to the intermediate-temperature radiator 14a in the rear-side portion of the casing 1, and a flow transmitted to the branch radiator 15 in the display unit through the connecting portions. Because the branch radiator 15 includes the fins 15c, there is generated a heat flow transmitted through the fins 15c to the frame plate 2. Although the display unit, which includes the back light 10 provided therein, also generates heat from it, the generated heat is conducted to the radiator 15 located nearby and released, with other heat, into the air through the radiator 15.

The heat generated by the heat generating portions is conducted and flows in the above-described manner, and such heat is released to the outside to thereby complete the entire heat flow, so that the temperatures of the component parts can be maintained under the particular level. This will be explained below.

The farther the component parts are located from the heat generating portions, the lower their temperatures are. Concerning the radiators which release heat into the outside air, the high-temperature radiator 14 located the closest to the heat generating portions has the highest temperature, and the branch radiator 15 and the intermediate-temperature radiator 14a, which are thermally connected to the radiator 14, have slightly lower temperatures. Further, the casing 1 and the frame plate 2, which are connected to the radiators 14 and 15 through the fins and the like, are radiators having the lowest temperatures. By the way, in an air-cooling system of a natural convection type without fans like the present invention, convection caused by density differences of the air is promoted because the temperature of the ambient air becomes higher as the temperatures of radiation surfaces are raised. As a result, there is caused convection corresponding to temperature levels in the vicinity of the radiators. Therefore, as shown in FIG. 3, the outside air spontaneously flows from air inlets 16a at the front-side of the keyboard toward air outlets 16b in the rear-side portion of the casing, and from air inlets 17a formed in the vicinity of the rotary portion toward air outlets 17b formed in the top of the display unit. This phenomenon is effected remarkably especially in the neighborhood of the radiators 14 and 15 which have relatively high temperatures, as described above. Natural heat radiation from the casing 1 and the frame plate 2 is smaller than that of the high-temperature radiator 14. Concerning the casing 1, however, heat flows 19 are additionally released through conduction to a computer installation surface 18 (e.g., the surface of a desk), as shown in FIG. 4.

Figure 6:
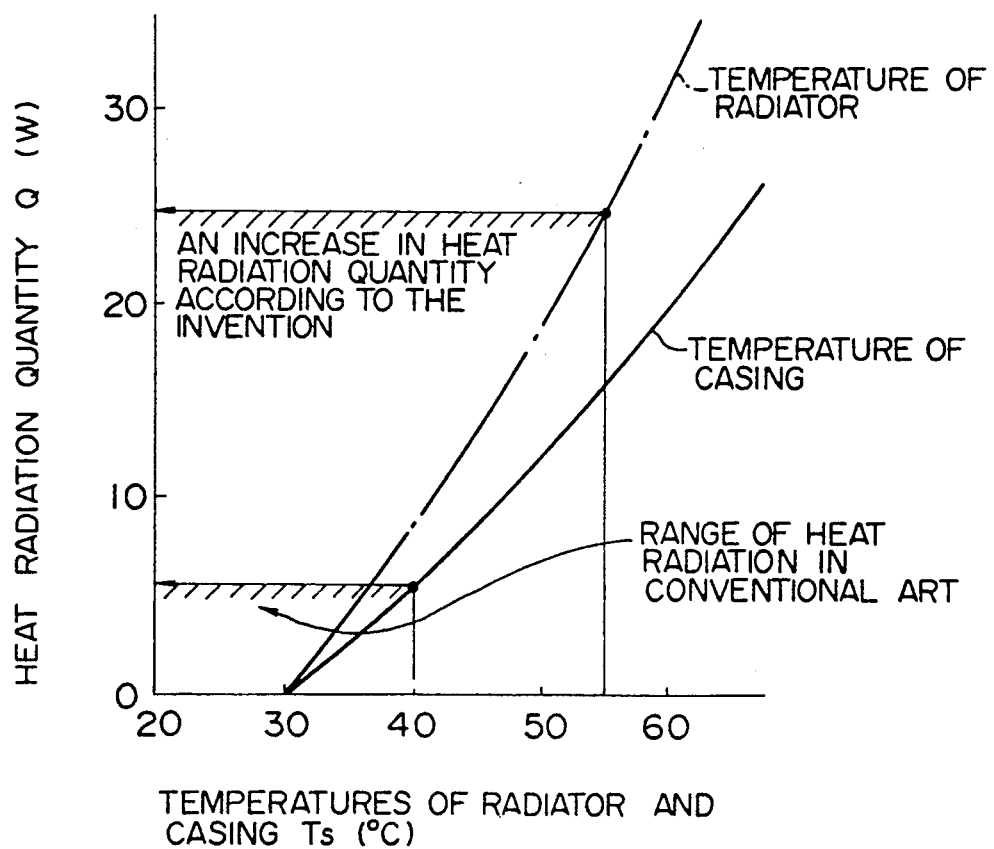
FIG. 6 is a graph for explaining the effect of the first embodiment.

The quantitative effect produced by the above-described operation will be now described. FIG. 6 illustrates a relation between radiator temperatures and heat radiation quantities when a small-sized computer of the A4 size is used in the air at a temperature of 30° C. Since the casing is touched by the operator's hands, it is necessary to suppress its temperature to about 40° C., and the heat radiation quantity is about 5 W. This is an allowable heat generation amount of a conventional personal computer. On the other hand, the high-temperature radiator of the above embodiment is provided inside of the casing so that the temperature of the radiator can be set at a high level, thereby drastically increasing the heat radiation quantity. Actually, since the highest temperature of the LSI chips is limited, the radiator temperature level should preferably be 50° to 60° C. Even in this case, however, heat radiation of about 25 W can be obtained, as easily understood from FIG. 6. As a result, heat radiation of about 30 W can be totally effected, and the allowable heat generation amount can be made significantly larger than that of the conventional art, thus increasing the processing speed of the computer to a great extent.

Figure 7:
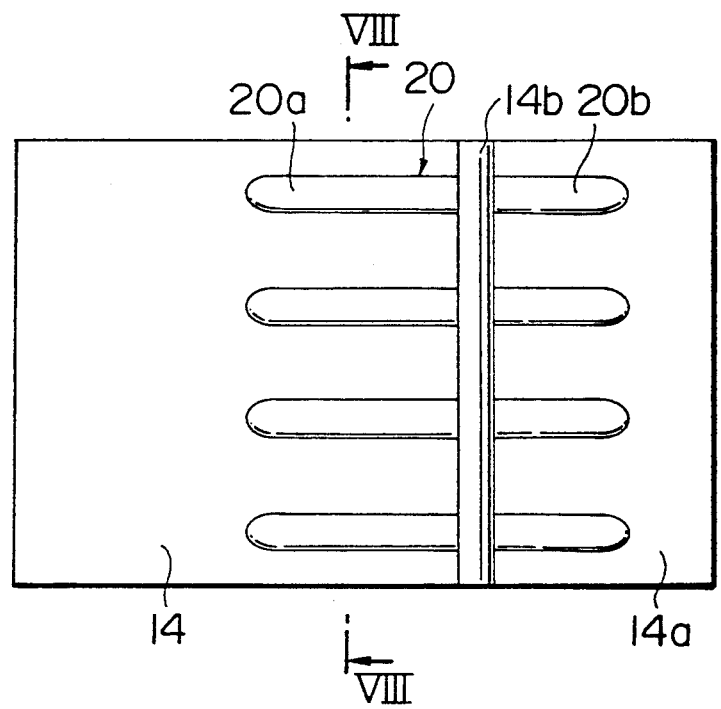
FIG. 7 is a partial view of a second embodiment.
Figure 8:
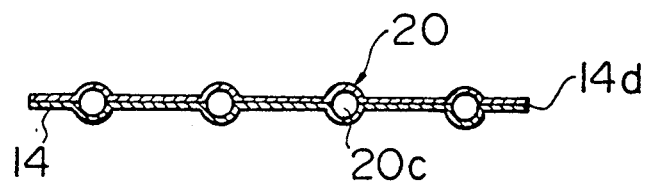
FIG. 8 is a sectional view taken along the line VIII—VIII in FIG. 7.

FIG. 7 shows a second embodiment according to the invention in which a part of the above-mentioned high-temperature radiator 14 is formed of heat pipes 20, and FIG. 8 is a sectional view taken along the line VIII—VIII in FIG. 7. As is commonly known, a heat pipe is composed of a metallic sealed pipe inside of which a capillary tube structure is formed and a small amount of liquid is sealed in a vacuum, and heat is absorbed from one end of the pipe owing to evaporation of the liquid, whereas heat is released from the other end of the pipe owing to condensation of the vapor. Many known examples in relation to such heat pipes are disclosed in, e.g., U.S. Pat. No. 4,520,865. In this embodiment, a radiator 14 is made of a double-layer joint plate in some places of which heat pipes 20 are formed, and a coolant sealed portion 20c, an evaporating portoin 20a and a condensing portion 20b are formed inside of each of the heat pipes 20. In this case, the area from the evaporating portion 20a to the condensing portion 20b of the heat pipe 20 can be maintained at substantially the same temperature, so that the whole radiator 14 will have a substantially uniform temperature, thereby obtaining a favorable convection effect over the wide surfaces.

Figure 9:
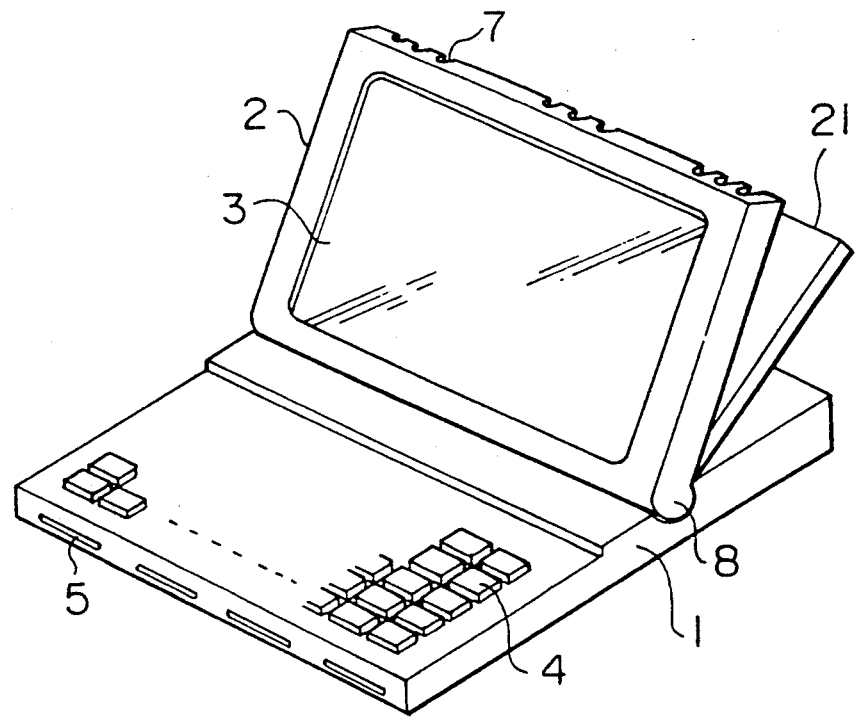
FIG. 9 is a front-side perspective view of a third embodiment.
Figure 10:
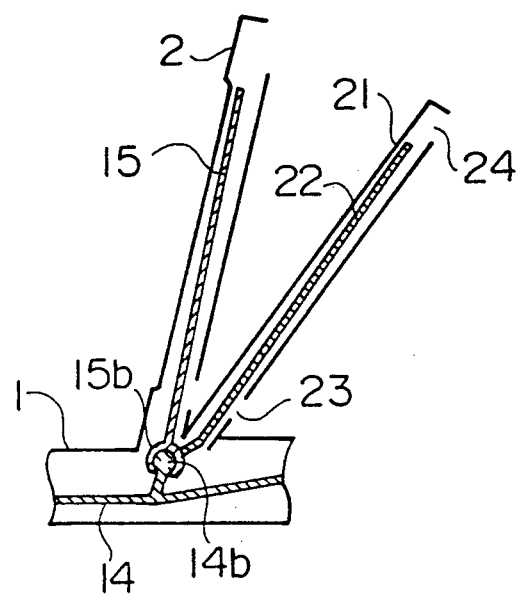
FIG. 10 is a partial, vertical sectional view of the third embodiment.

FIG. 9 shows a third embodiment according to the invention in which an auxiliary heat radiation unit 21 is swingably provided, as an additional member, at the back of a display screen frame plate 2, and FIG. 10 is a partial, vertical sectional view of the same. More specifically, auxiliary radiators 22 are connected to a high-temperature radiator 14 through common connecting portions 14b and 15b, so that heat conducted to the auxiliary radiators 22 will be cooled down by the outside air flowing in from air inlets 23 and flowing out from air outlets 24. When a desired number of auxiliary radiators are provided in parallel, as in this embodiment, the radiation quantity can be further increased.

Figure 11:
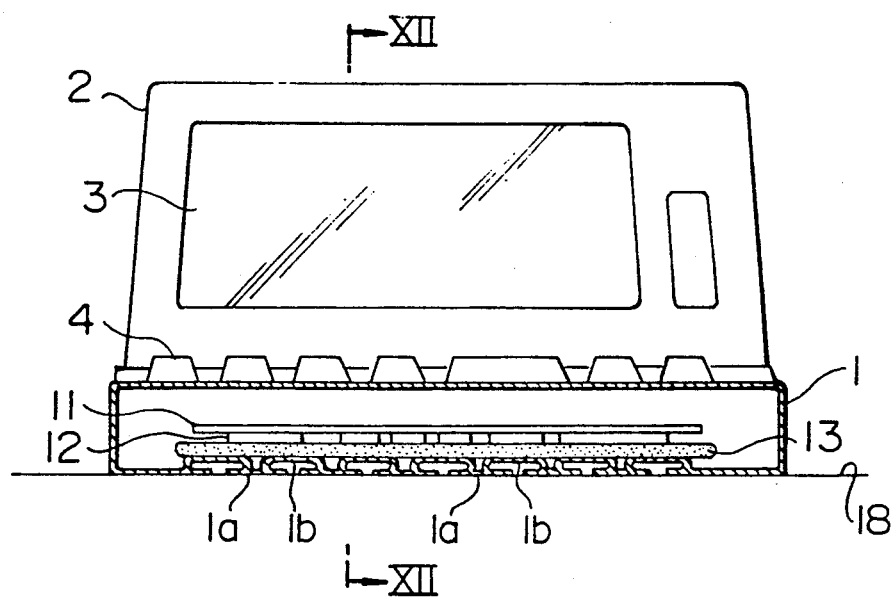
FIG. 11 is a horizontal sectional view of a fourth embodiment, taken along the line XI—XI in FIG. 12.
Figure 12:
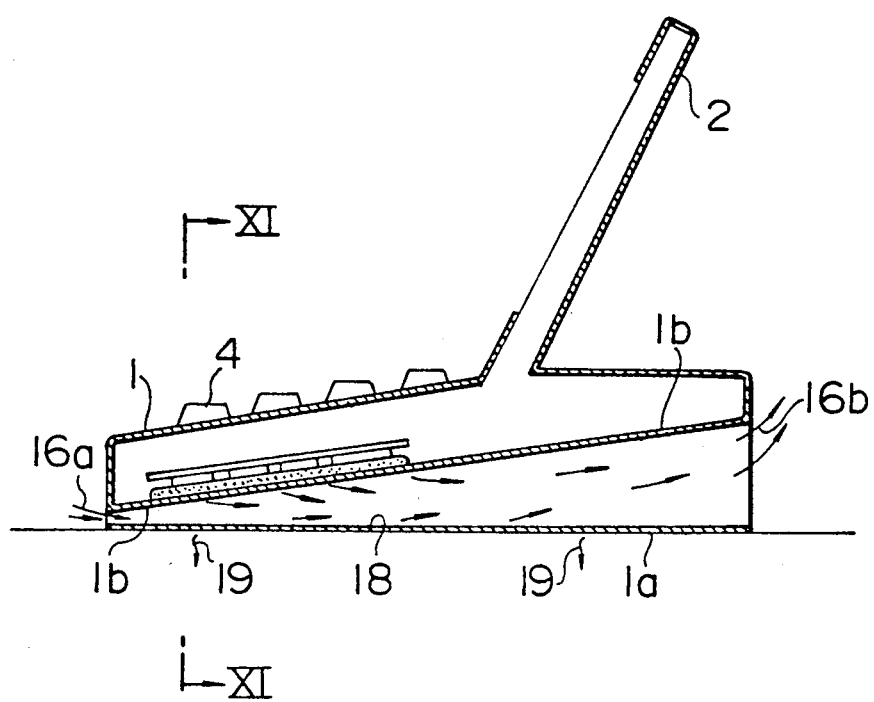
FIG. 12 is a vertical sectional view of the fourth embodiment, taken along the line XII—XII in FIG. 11.

FIGS. 11 and 12 show a fourth embodiment according to the invention. FIG. 12 is a sectional view taken along the line XII—XII in FIG. 11, and FIG. 11 is a vertical sectional view taken along the line XI—XI in FIG. 12. In this embodiment, radiators having different temperature levels are provided inside of a single casing. More specifically, a large number of grooves having a substantially C-shaped cross-section whose height is gradually increased in a direction of the depth are integrally formed on the bottom of a casing 1. Upper surface portions 1b and lower surface portions 1a of these grooves function as high-temperature radiators and low-temperature radiators, respectively, and the outside air flows into and out of groove spaces between them from front-side inlets 16a to rear-side outlets 16b. The high-temperature radiators 1b are directly connected to heat generating portions 12 through a heat-conductive member 13 inside the casing 1, and the low-temperature radiators 1a define the outermost (lowest) surface of the casing 1. Since the gap between the high-temperature radiators 1b and the low-temperature radiators 1a is about several mm at the front side, fingers of the operator will not touch the inside high-temperature radiators 1b. This embodiment is advantageous in that it is economical because it is not necessary to install high- and low-temperature radiators as separate members from the casing 1.

Figure 13:
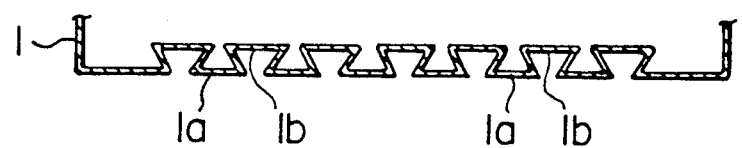
FIG. 13 is a partial, sectional view of a fifth embodiment.
Figure 14:
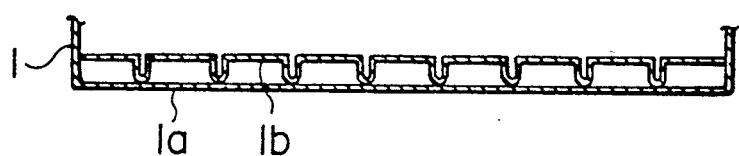
FIG. 14 is a partial, sectional view of a sixth embodiment.

FIGS. 13 and 14 show modifications of the embodiment shown in FIGS. 11 and 12, which are fifth and sixth embodiments according to the invention, respectively. Each of the figures is an equivalent of the sectional view taken along the line XI—XI in FIG. 12. In the embodiment shown in FIG. 13, a bottom plate of a casing 1 has grooves of a dovetail shape which are formed in a series. Upper surface portions 1b and lower surface portions 1a of these grooves function as high-temperature radiators and low-temperature radiators, respectively, and the outside air flows into and out of groove spaces between them. On the other hand, in the embodiment of FIG. 14, an uneven plate 1b, as illustrated in the figure, is fixed on a bottom plate 1a of a casing 1. Upper surface portions of the uneven plate 1b and the bottom plate 1a function as high-temperature radiators and low-temperature radiators, respectively, and the outside air flows into and out of gaps between them. Other component parts have substantially the same structure as the embodiment shown in FIGS. 11 and 12.

Figure 15:
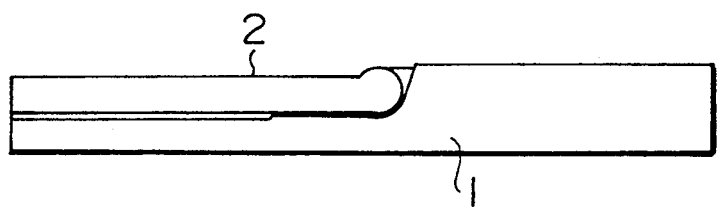
FIG. 15 is a side view of a seventh embodiment when a computer is unoperated.
Figure 16:
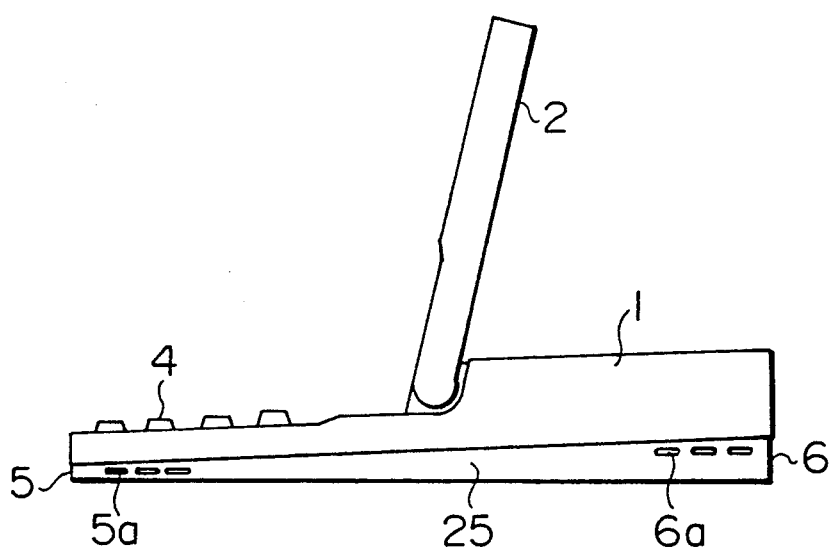
FIG. 16 is a side view of the seventh embodiment when the computer is operated.
Figure 17:
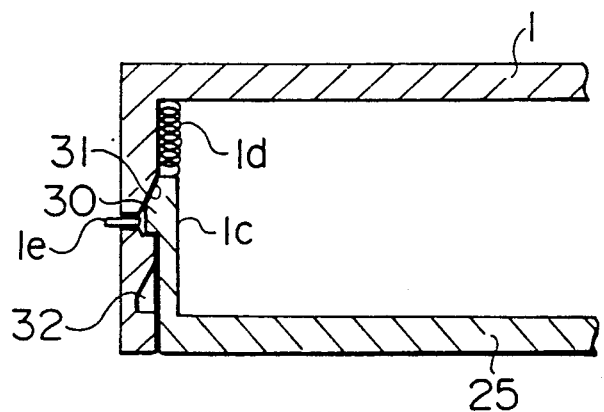
FIG. 17 is a partial, sectional view of the seventh embodiment when the computer is unoperated.
Figure 18:
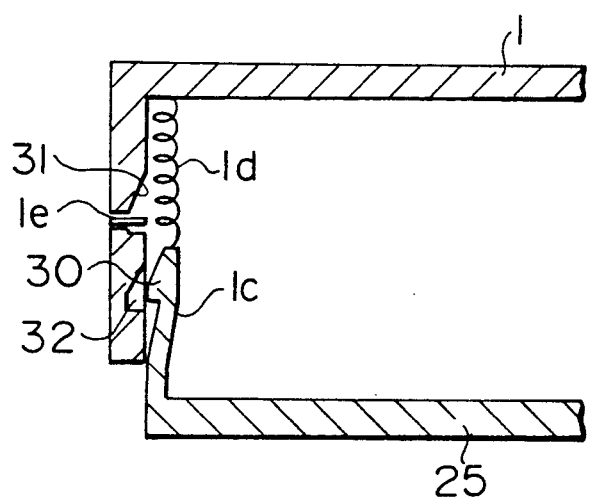
FIG. 18 is a partial, sectional view of the seventh embodiment when the computer is operated.

FIGS. 15 and 16 show a seventh embodiment according to the invention in which the bottom of a casing 1 has a double structure by providing a movable air duct member 25. When the computer is unoperated, side walls of the casing 1 and side walls of the movable air duct member 25 are overlapped at a lower portion of the casing, as shown in FIG. 15. When the computer is operated, the movable air duct member 25 is projected downwardly from the side walls of the casing 1, thus defining a space therein, as shown in FIG. 16. This space serves to let the outside air in and out, and air inlets 5, 5a and air outlets 6, 6a are formed in proper portions of the side walls of the movable air duct member 25. These air inlets and outlets are closed by the side walls of the casing 1, as shown in FIG. 15, when the computer is unoperated. The casing 1 contains a heat conductive member 13 and radiators 14, 14a and 15 which are similar to those shown in FIGS. 3 and 4. With such a structure, when the computer is unoperated, it can be made compact and can prevent the dust from entering from the air inlets and outlets, and when it is operated, its cooling efficiency can be improved to enable high-speed processing. One example of a mechanism for displacing the movable air duct member 25 of this embodiment out of and into the casing 1 will be described with reference to FIGS. 17 and 18. Some portions of the side walls of the movable air duct member 25 form elastic portions 1c with hooks 30, and compression springs 1d are provided between these side walls and the casing 1. When the computer is unoperated, as shown in FIG. 17, the hooks 30 of the elastic portions 1c are engaged in notches 31 formed on the side walls of the casing 1, and the movable air duct member 25 is maintained in the receding position, as shown in FIG. 15. When the computer is operated, the engagement is released by pressing push buttons 1e so that the movable air duct member 25 will be pressed downwardly by the compression springs 1d and stopped as the hooks 30 are brought into engagement with lower notches 32, as shown in FIG. 18. Thus, the movable air duct member 25 is projected, as shown in FIG. 16. In order to bring it into the condition of the unoperated computer shown in FIGS. 15 and 17 again, the casing 1 is simply pressed down against forces of the compression springs 1d.

Figure 19:
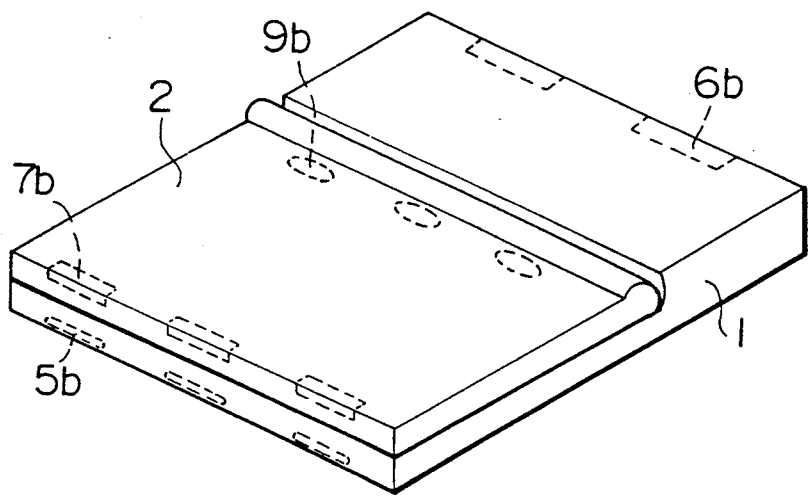
FIG. 19 is a perspective view of an eighth embodiment when a computer is unoperated.
Figure 20:
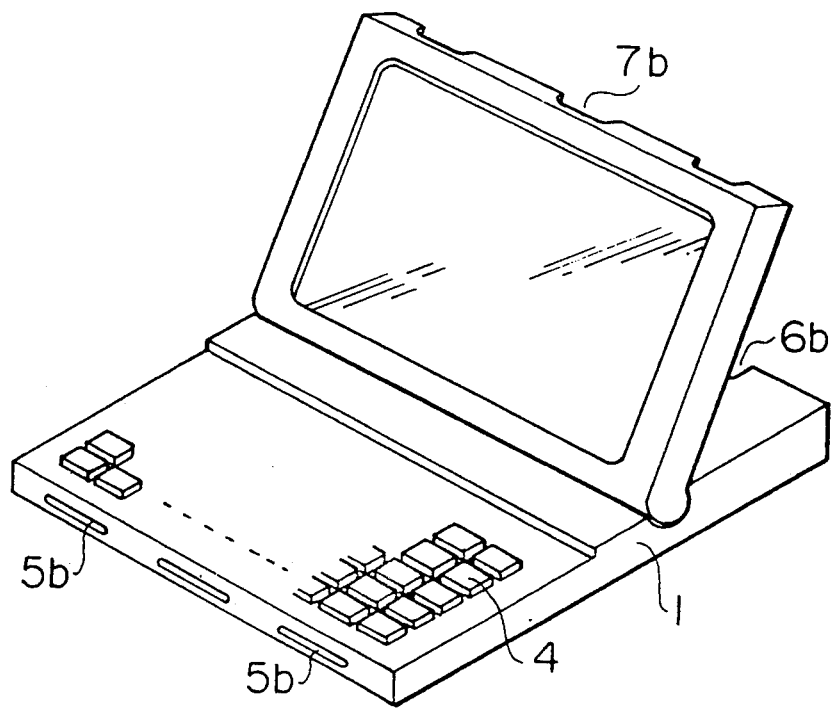
FIG. 20 is a perspective view of the eighth embodiment when the computer is operated.
Figure 21:
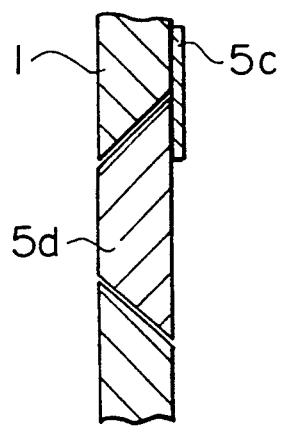
FIG. 21 is a partial, sectional view of the eighth embodiment when the computer is unoperated.
Figure 22:
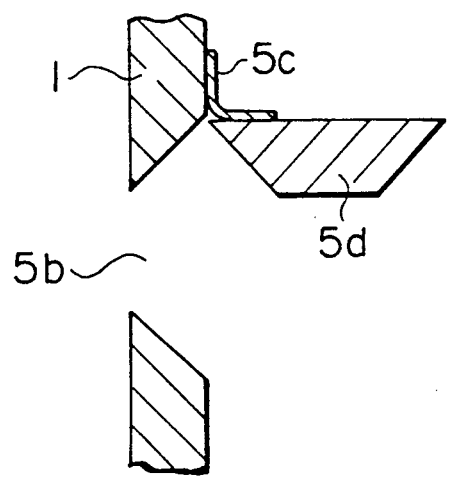
FIG. 22 is a partial, sectional view of the eighth embodiment when the computer is operated.

FIGS. 19 and 20 show an eighth embodiment according to the invention in relation to an opening/closing mechanism of inlets and outlets of the outside air for cooling. More specifically, air inlets and outlets 5b, 6b, 7b and 9b are closed when the computer is unoperated, as shown in FIG. 19, and they are opened only when the computer is operated, as shown in FIG. 20. With such a structure, the dust or the like does not enter the computer from the outside when it is unoperated, so that the reliability of the computer can be prevented from deteriorating. One example of such an opening/closing mechanism of air inlets and outlets will be described with reference to FIGS. 21 and 22. The air inlets and outlets are closed by cover members 5d which are supported by shape-memory alloy members 5c when the computer is unoperated, as shown in FIG. 21. When the power source is turned on to operate the computer, power is supplied to the shape-memory alloy members 5c, and they are deformed to thereby open the cover members 5d, as shown in FIG. 22.

Figure 23:
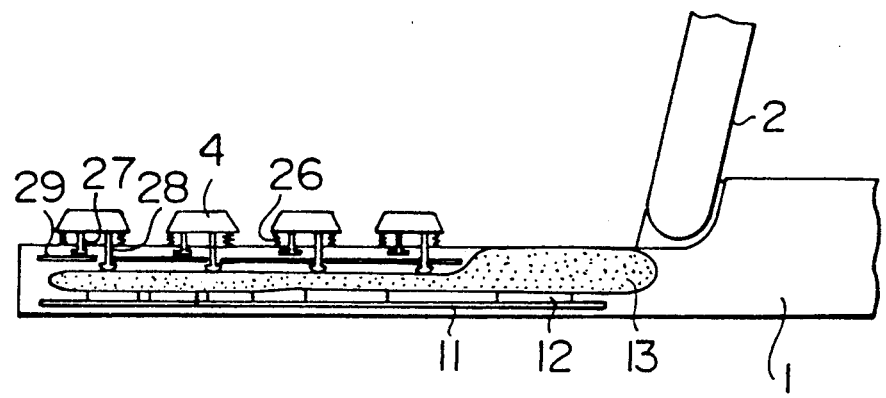
FIG. 23 is a partial, sectional view of a ninth embodiment when keys are not pressed down.
Figure 24:
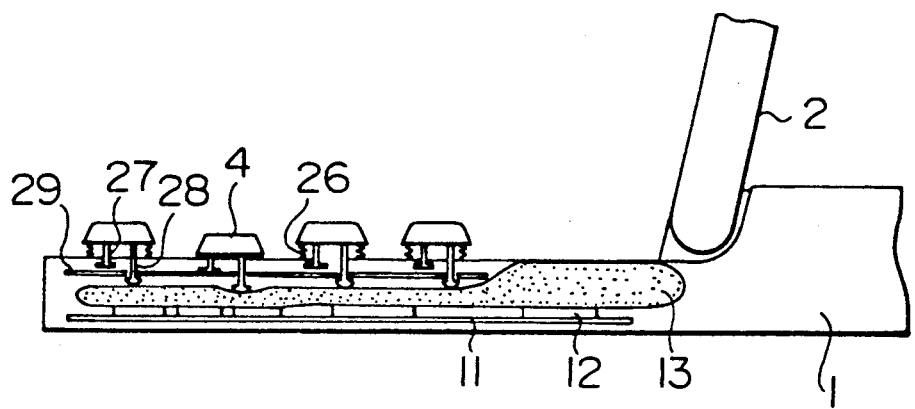
FIG. 24 is a partial, sectional view of the ninth embodiment when a key is pressed down.

FIGS. 23 and 24 show a ninth embodiment according to the invention which is a mechanism for transmitting heat generated by LSI chips to a radiator effectively by inserting a heat-conductive member 13 of an elastic structure inside a casing 1. When the above-mentioned liquid-sealed bag is used as the heat-conductive member 13, the heat conductivity is improved by promoting convection of the liquid. In this embodiment, such convection is realized by keyboard operation. More specifically, each key 4 on the keyboard is provided with a pressure rod 28 which is moved vertically as the key 4 is turned on and off. FIG. 23 shows a condition in which keys 4 are off, and FIG. 24 shows a condition in which a desired one of the keys 4 is on. Since the keys 4 are turned on and off discontinuously, the liquid in the heat-conductive member 13 is forcibly displaced horizontally. As a result, the convection of the liquid is promoted to improve the heat conductivity remarkably. This structure is superior to the above-described embodiments particularly in that no special drive forces are required at all for promoting the liquid convection. In the figures, reference numeral 27 denotes a contact rod; 29 denotes a contact sheet; and 26 denotes a key spring. In this embodiment, the heat-conductive member 13 is in contact with a portion of a casing 1 between the keyboard and a display screen frame plate 2, and this portion of the casing 1 serves as a radiator. This arrangement is based on the consideration that the above-mentioned portion of the casing 1 is usually out of the reach of the operator while operating the computer, and that there is no problem in using this portion as a radiator.

Figure 25:
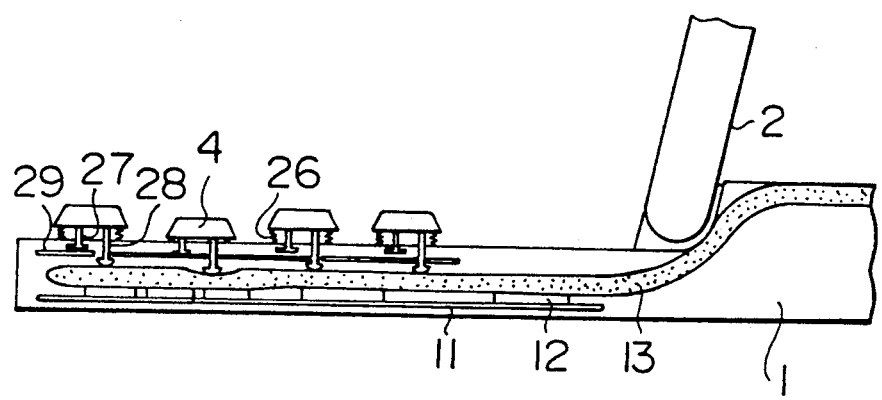
FIG. 25 is a partial, sectional view of a tenth embodiment.

FIG. 25 shows a tenth embodiment according to the invention which is different from the embodiment of FIGS. 23 and 24 in that a heat-conductive member 13 is in contact with a portion of a casing 1 at the back of a display screen frame plate 2, and that this portion serves as a radiator. This arrangement is based on the consideration that it is less probable for the operator to touch the portion of the casing 1 at the back than the above-mentioned portion in front when operating the computer.

Figure 26:
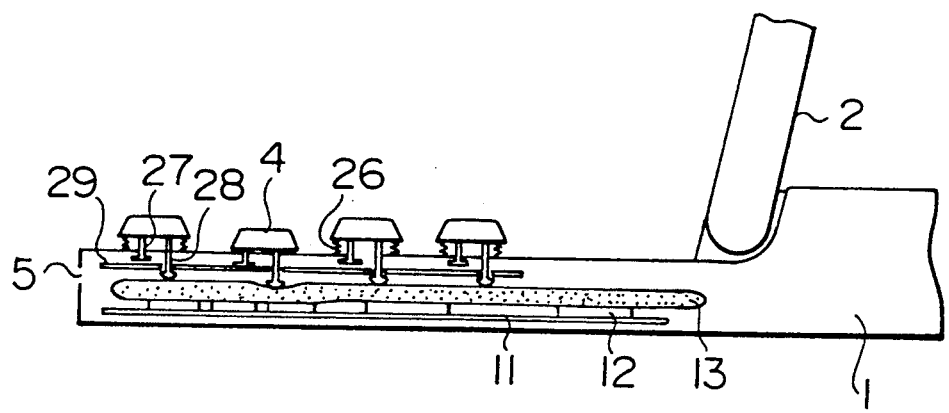
FIG. 26 is a partial, sectional view of an eleventh embodiment.

FIG. 26 shows an eleventh embodiment according to the invention in which air inlets 5 and air outlets are formed at appropriate locations in the embodiment of FIGS. 23 and 24 in substantially the same manner as the first embodiment, so as to cool a heat-conductive member 13 which is not contacted with a casing 1, by use of the outside air flowing in and out of the casing 1.

As described on the basis of the preferred embodiments, in comparison with the conventional art, the small-sized computer packaging structure according to the present invention can achieve remarkable improvements in functions, performances and so forth as follows:

1) While maintaining the casing temperature at about 40° C. at most, the quantity of heat radiation by natural air-cooling can be significantly increased as compared with the conventional art.

2) The processing speed of the small-sized computer can be accordingly improved to a large extent.

3) Since the heat radiation quantity equivalent to that of forcible air-cooling (with fans) effected in the conventional small-sized computer can be obtained through natural air-cooling, great effects can be produced in the noise reduction, energy saving, compactness, cost reduction and reliability.

What is claimed is:

1. A portable computer having an air natural convection and heat radiation structure including computer component parts which generate heat and are provided in a casing,
   wherein a high-temperature radiator is heat-conductively connected to said heat generating computer component parts via a heat-conductive member inside said casing,
   a low-temperature radiator is formed by at least one part of said casing thermally connected to said high-temperature radiator,
   an air passage in said casing is formed between said high-temperature radiator and said low-temperature radiator, and
   each of said high-temperature and low-temperature radiators is formed so as to have a respective area of heat radiation larger than an area of a surface of said heat generating computer component parts.

2. A portable computer according to claim 1, wherein said casing has a plurality of portions formed with air holes to let the air in and out.

3. A portable computer according to claim 2, wherein the high-temperature radiator located inside said casing is branched, through movable connecting portions, to one of an auxiliary radiator provided on a back of a display located outside of said casing and a separate auxiliary radiator.

4. A portable computer according to claim 1, wherein said heat-conductive member interposed between said heat generating parts and said radiator is a bag-like member having an elastic structure containing highly heat-conductive fluid in a convective state, said elastic-structure member being arranged to be locally deformed when pressed in response to movements of keys on a keyboard of the portable computer.

5. A portable computer having a first casing housing heat generating portions, and a second casing provided on said first casing so as to be freely opened and closed, said second casing forming a display unit of the portable computer, said portable computer including an input device formed on a surface of said first casing which faces a display surface of the display unit of said second casing,
   wherein a high-temperature radiator which absorbs heat generated by said heat generating portions is provided inside of said input device of said first casing, and a low-temperature radiator which is thermally connected with said high-temperature radiator is provided on a back of the display surface inside of said second casing.

6. A portable computer comprising a display unit, a computing unit and an input unit, which display unit is provided on said input unit so as to open and close freely,
   wherein said input unit including input means, a high-temperature radiator being provided inside said input unit to thermally contact said input means through a heat-conductive member,
   said display unit is provided with display means for displaying characters and images, a back side of said display means being provided with an auxiliary radiator thermally connected with said high-temperature radiator, and
   a low-temperature radiator is formed out of at least one part of a casing of said display unit so as to form a passage between said auxiliary radiator and said casing of said display unit.

7. A portable computer according to claim 6, wherein said high-temperature radiator is branched to be thermally connected with said low-temperature radiator and to a section extended toward the back of said input unit.

8. A portable computer according to claim 6, wherein air holes are formed in the front side of said input unit and at an end face in the front side of said display unit which corresponds to said front side of the input unit when closing the display unit, and a passage for communicating with said air holes is formed by said high-temperature radiator and the portable computer casing.

* * * * *